(12) United States Patent
Schönfelder (10) Patent No.: US 6,580,535 B1
(45) Date of Patent: Jun. 17, 2003

(54) POLARIZATION DIVISION MULTIPLEXING IN OPTICAL DATA TRANSMISSION SYSTEMS

(75) Inventor: Thorsten Schönfelder, Harsum (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/472,841

(22) Filed: Dec. 28, 1999

(51) Int. Cl.⁷ .................................................. H04J 14/06
(52) U.S. Cl. ...................................... 359/122; 359/156
(58) Field of Search ................................ 359/122, 124, 359/127, 156

(56) References Cited

U.S. PATENT DOCUMENTS

| | | | |
|---|---|---|---|
| 3,752,992 A | 8/1973 | Fluhr | 250/199 |
| 4,406,003 A | 9/1983 | Eberly et al. | 370/3 |
| 5,111,322 A | * 5/1992 | Bergano et al. | 359/122 |
| 5,377,035 A | * 12/1994 | Wang et al. | 359/156 |
| 5,790,721 A | 8/1998 | Lee | 385/11 |
| 5,841,557 A | 11/1998 | Otsuka et al. | 359/122 |
| 5,870,213 A | 2/1999 | Ishikawa et al. | 359/135 |
| 5,898,517 A | 4/1999 | Weis | 356/509 |
| 5,929,946 A | 7/1999 | Sharp et al. | 349/18 |
| 5,930,266 A | 7/1999 | Ramsey et al. | 370/480 |
| 5,940,196 A | 8/1999 | Piehler et al. | 359/133 |
| 6,163,393 A | * 12/2000 | Wu et al. | 359/127 |
| 6,301,030 B1 | * 10/2001 | Robinson | 359/122 |

FOREIGN PATENT DOCUMENTS

| | | |
|---|---|---|
| EP | 0 507 508 A2 | 10/1992 |
| JP | 54157003 | 12/1979 |

OTHER PUBLICATIONS

Siddiqui et al., "Two–Channel Optical Fiber Transmission Using Polarization Division Multiplexing", *Journal of Optical Communications*, vol. 12, No. 2, pp. 47–49 (Berlin, Jun. 1991).

European Standard Search Report Date of Completion: Jul. 28, 2000; Date of Mailing: Aug. 2, 2000.

* cited by examiner

*Primary Examiner*—Kinfe-Michael Negash (57) ABSTRACT

Two optical signals of the same wavelength are polarization filtered at a sending end into orthogonal polarization orientations, and then added into a single optical transmission signal having various polarization components. The optical transmission signal is transmitted via an optical data link to a receiving end having a splitter. Portions of the optical transmission signal are inputted to different polarization filters logically corresponding to those at the sending end, to recover the two optical signals originally sent.

4 Claims, 6 Drawing Sheets

POLARIZATION DIVISION MULTIPLEXING IN OPTICAL DATA TRANSMISSION SYSTEMS

BACKGROUND

This invention involves an improved method and apparatus of multiplexing optical data. In particular, the present invention pertains to a method and apparatus for polarization division multiplexing data which is to be transmitted in an optical data transmission or communication system.

The communications and information service industries have been able to vastly improve existing services and branch into new services as a result of advancing data transmission and communications technologies. The field of optical data transmission is one such technological area in which a number of advances has been made. Optical communication and data transmission systems have recently been an especially fast growing segment of the information infrastructure. Tens of thousands of miles of fiber optic cable have been installed to create optical networks interconnecting the globe. These optical networks enable tremendous amounts of data to be transmitted.

An early use of optical networks was for the transmission of voice signals in telecommunication applications. At present, a number of forms of data and information are being transmitted via optical networks. For instance, optical networks are commonly found in such applications as cable television, video-on-demand, interactive services data transmission, multimedia signals, fields employing optical instruments, as well as many other technologies. Data transmission via optical networks is advantageous because it has low delay and offers large bandwidth.

A disadvantage of optical networks is the relatively high cost associated with the installation of these networks. Since the high cost of optical data transmission must be passed on to subscribers or users of services, cost is a drawback to service providers that consider implementing optical networks. Even though optical data transmission is widely used in a number of applications, the burdensome costs (e.g., costs per line) of installing fiber-optic cable effectively impedes the expansion of optical networks into lower margin functions or services. One way of reducing costs is to increase efficiency in data transmission. That is, if more data can be transmitted using the same amount of bandwidth (e.g., within the same fiber), the cost per line of optical data transmission can be lowered.

One conventional approach to increasing the data rate of optical data transmission is through the use of wavelength division multiplexing (WDM), in which multiple different wavelengths are carried over a common fiber-optic waveguide. WDM separates a given, or allocated, bandwidth into several channels and provides a more efficient use of the available bandwidth than transmitting over fiber-optic cables without wavelength channelization. Dense channel wavelength division multiplexing (DWDM) is an offshoot of WDM through which the bandwidth may be separated into 32 or more channels. Through use of techniques such as WDM or DWDM, fiber-optical telecommunications systems may be more efficiently utilized.

Specialized equipment is needed to combine and then separate optical signals in wavelength division multiplexed systems. In practice, a number of devices have been used for optical multiplexing in WDM fiber-optic telecommunications systems, as well as in the field of spectroscopic analysis. Such devices include, for example, optical diffraction gratings, prisms, and various optical filters. The conventional devices required to implement WDM tend to be expensive, and require light sources with a relatively narrow optical spectrum, or filters with a relatively narrow bandwidth, in order to multiplex the signal per wavelength. In addition, such conventional devices are adversely affected by environmental fluctuations such as conditions of varying temperatures.

Accordingly, it would be desirable to develop new techniques for efficiently transmitting information over optical media that overcome the problems associated with WDM devices.

SUMMARY

The present invention is drawn to an apparatus and method for polarization division multiplexing.

Generally speaking, exemplary embodiments are directed to an optical polarization multiplexing system having two orthogonal polarization filters at the transmitting end, and two corresponding polarization filters at the receiving end. A first optical signal to be transmitted is subjected to one of the two polarization filters at the transmitting end. A second optical signal to be transmitted, having the same frequency as the first optical signal, is subjected to the other polarization filter. The two polarized signals are then added by an optical adder to produce a single (composite) optical transmission signal having two variously polarized components. The composite optical transmission signal is transmitted via an optical link to an optical splitter at the receiving end, which splits the signal into two signals. Each of these signals is routed towards an optical polarization filter. One of the polarization filters recovers the first optical signal, and the other polarization filter recovers the second optical signal.

The present invention overcomes the drawbacks of conventional systems set forth above and other shortcomings of conventional optical multiplexing systems. For instance, one advantage of the polarization division multiplexing system according to the present invention is the more efficient use of spectrum to communicate data. That is, more data can be conveyed using the same amount of optical bandwidth than was possible using conventional approaches. Another advantage of the present invention is that through use of polarization division multiplexers, optical receivers and transmitters having relatively wide optical spectrums may be employed, as compared to conventional optical multiplexers. Another advantage of the present invention is the decreased sensitivity with respect to the wavelength of optical transmitters and receivers to environments subject to varying temperature conditions. Another advantage of the present invention, is that polarization division multiplexing may be used in conjunction with conventional multiplexing or optical bandwidth optimizing systems to provide increased data transmission efficiency.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 1:
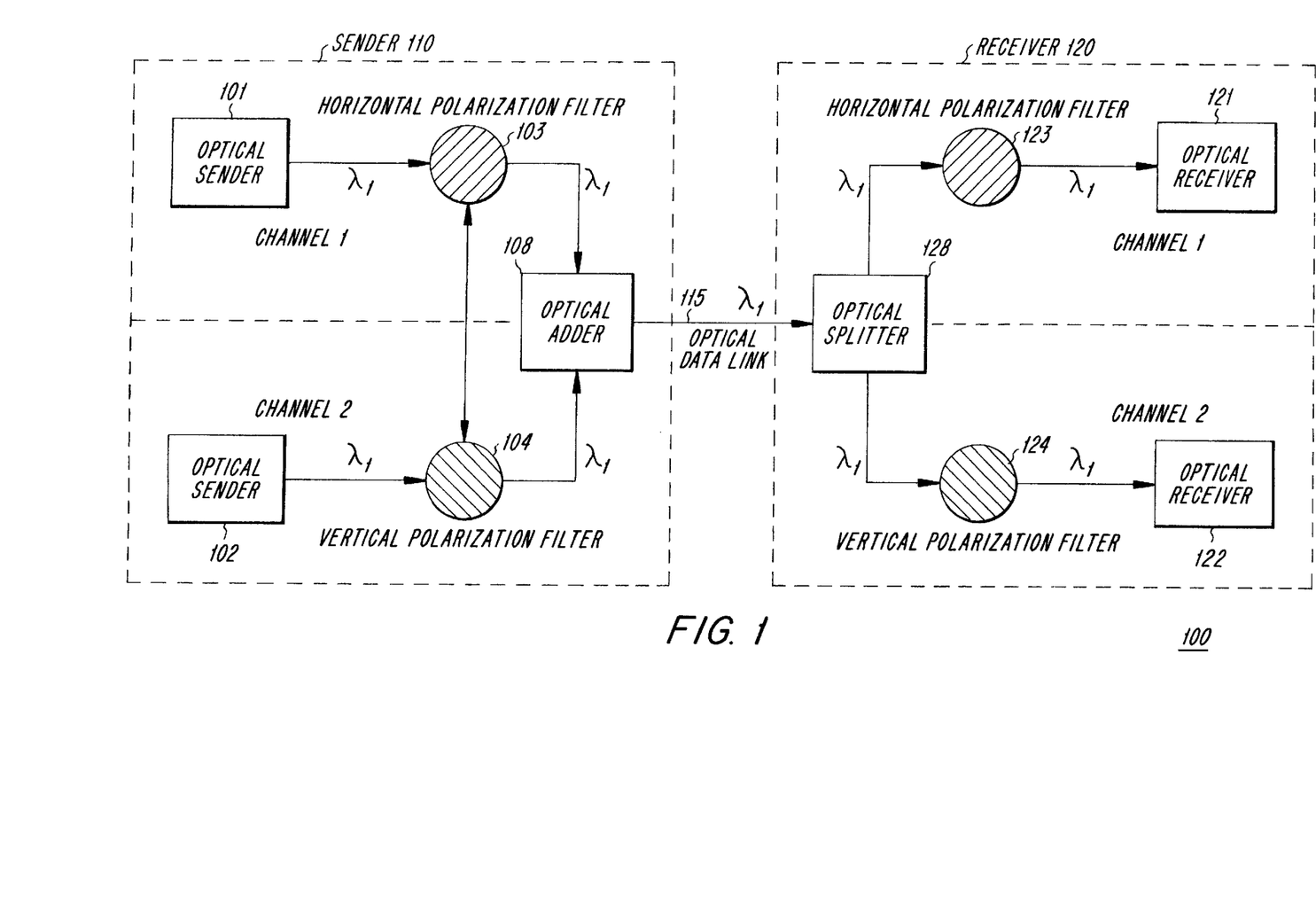
FIG. 1 is an exemplary embodiment of an optical polarization multiplexing system, according to the present invention.

FIG. 1 is an exemplary embodiment of an optical polarization multiplexing system 100, according to the present invention. The optical polarization multiplexing system 100 may be used as optical communication or transmission system. The definition of an "optical communication or transmission system," as used herein, is any system which uses optical signals to convey information across an optical medium. Such optical systems may have applications in, for example, telecommunications systems, cable television systems, local area networks (LANs), or other networks in which information is communicated using light signals (visible or invisible).

The optical polarization multiplexing system 100 may also be used in place of, or in conjunction with, an existing optical communication or transmission system. For instance, the optical polarization multiplexing system 100 according to the present invention may be coupled to an existing WDM system to further increase the data transmission efficiency.

The optical polarization multiplexing system 100 has a sender (transmitter) 110 connected to a receiver 120 via optical data link 115. The sender 110 includes optical senders 101 and 102. The sender 110 includes two polarization filters, labeled filter 103 and filter 104, which are orthogonal to each other. The filters 103 and 104 may, for instance, be a horizontal polarization filter and a vertical polarization filter, respectively. However, it is not necessary that the filters 103 and 104 have any particular polarization orientation with respect to the earth or any other external reference frame. Finally, the sender 110 includes an optical adder 108. In regard to FIG. 1, it should be noted that in practice each end of a communication system would be equipped with both a sender and a receiver, so as to send and receive optical data.

Figure 2A:
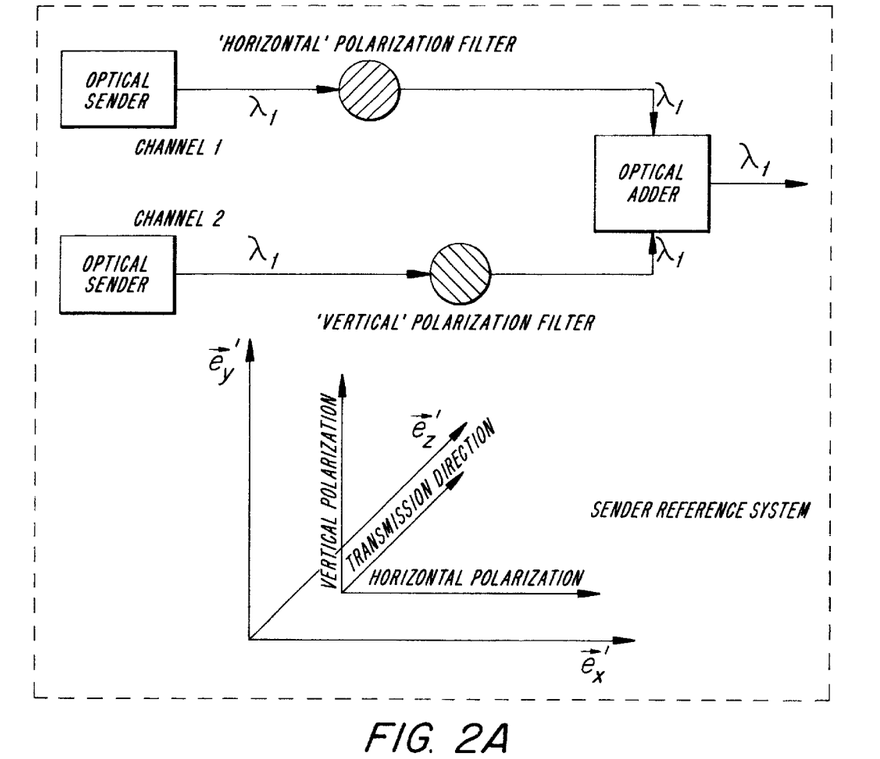
FIGS. 2A and 2B depict an exemplary reference system relationship for the two polarization filters at the sender end chosen to be a horizontal and vertical polarization filters.
Figure 2B:
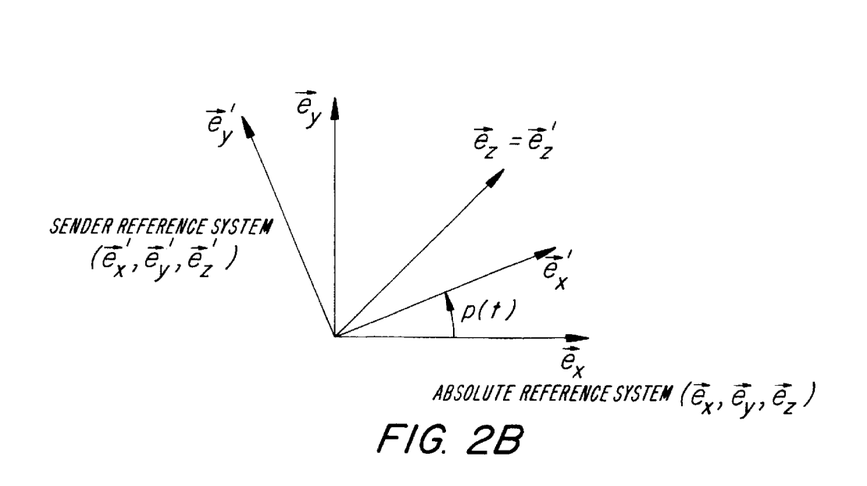

FIGS. 2A and 2B depict an exemplary mathematical relationship between the sender 110 reference system and an absolute reference system in the case where the two polarization filters 103 and 104 are chosen to be a horizontal polarization filter and a vertical polarization filter. The relationship between the sender reference system ($\vec{e}'_x$, $\vec{e}'_y$, $\vec{e}'_z$) and the absolute reference system ($\vec{e}_x$, $\vec{e}_y$, $\vec{e}_z$) may be described by the following equations.

$$\vec{e}'_x = \begin{pmatrix} \cos(\rho(t)) \\ \sin(\rho(t)) \\ 0 \end{pmatrix} = \cos(\rho(t))\vec{e}_x + \sin(\rho(t))\vec{e}_y \quad (1)$$

$$\vec{e}'_y = \begin{pmatrix} -\sin(\rho(t)) \\ \cos(\rho(t)) \\ 0 \end{pmatrix} = -\sin(\rho(t))\vec{e}_x + \cos(\rho(t))\vec{e}_y \quad (2)$$

$$\vec{e}'_z = \vec{e}_z; \quad \rho(t) = \rho(t) = \omega t + \rho_0 \quad (3)$$

In the above relationships, the variable t=time, the variable ω=angular velocity, and the variable $\rho_0$=angle offset. In addition, the variable ω may be specified to vary as a function of time, that is ω need not be fixed with respect to time. For the special case in which ω=0 and $\rho_0$=0, the absolute reference system and sender reference system are horizontal with respect to each other and vertical with respect to each other.

Returning to FIG. 1, the receiver 120 includes, for instance, optical receivers 121 and 122, polarization filter 123, polarization filter 124, and optical splitter 128. As set forth above for the sender 110, the two orthogonal polarization filters 123 and 124 in the receiver need not have any particular orientation to the earth or any other external reference frame, or to the polarization filters 103 and 104 in the sender 110.

Figure 2C:
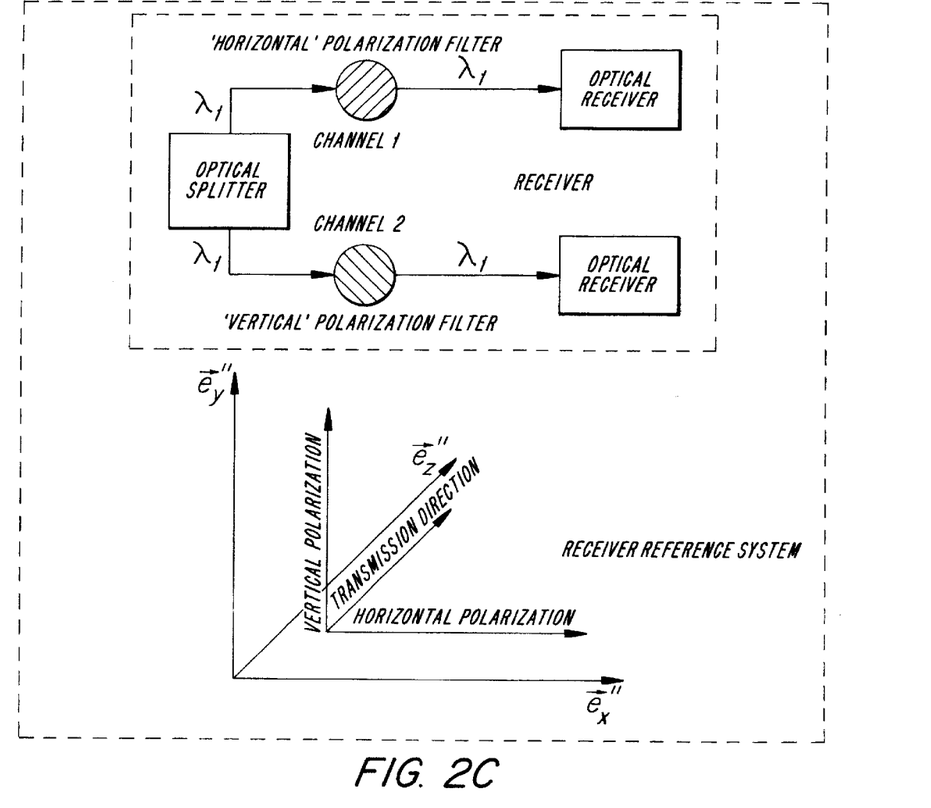
FIGS. 2C and 2D depict an exemplary reference system relationship for the two polarization filters at the receiver end chosen to be a horizontal and vertical polarization filters.
Figure 2D:
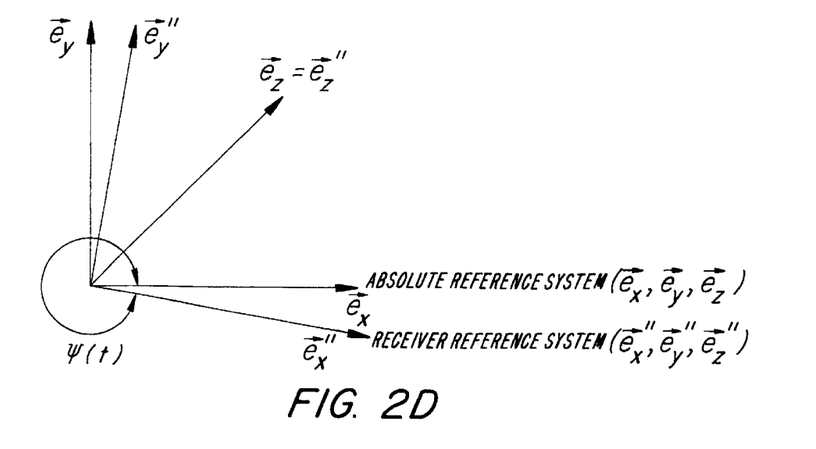

FIGS. 2C and 2D depict the relationship between the receiver 120 reference system and an absolute reference system in the case where the two polarization filters 123 and 124 are chosen to be a horizontal polarization filter and a vertical polarization filter. The relationship between the receiver reference system ($\vec{e}''_x$, $\vec{e}''_y$, $\vec{e}''_z$) and the absolute reference system ($\vec{e}_x$, $\vec{e}_y$, $\vec{e}_z$) may be described by the following equations.

$$\vec{e}''_x = \begin{pmatrix} \cos(\psi(t)) \\ \sin(\psi(t)) \\ 0 \end{pmatrix} = \cos(\psi(t))\vec{e}_x + \sin(\psi(t))\vec{e}_y \quad (4)$$

$$\vec{e}''_y = \begin{pmatrix} -\sin(\psi(t)) \\ \cos(\psi(t)) \\ 0 \end{pmatrix} = -\sin(\psi(t))\vec{e}_x + \cos(\psi(t))\vec{e}_y \quad (5)$$

$$\vec{e}''_z = \vec{e}_z; \quad \psi(t) = \psi t + \psi_0 \quad (6)$$

In the above relationships, the variable t=time, the variable ω=angular velocity, and the variable $\psi_0$=angle offset. In addition, the variable ω may be specified to vary as a function of time, that is ω need not be fixed with respect to time. For the special case in which ω=0 and $\psi_0$=0, the absolute reference system and receiver reference system are horizontal with respect to each other and vertical with respect to each other.

The optical data link 115 may be a fiber optic cable, glass conduit, waveguide, light frequency transmission line, or any other optical transmission medium. Alternatively, the optical data link 115 may be a natural interface (e.g., a vacuum, a liquid such as water, or a gas such as oxygen) rather than a specially created optical conduit. The optical data link 115 is capable of transmitting polarized light. That is, polarized light can be transmitted via the optical data link 115 without significantly changing its polarization characteristics. Thus, according to exemplary embodiments of the present invention, light having two orthogonally polarized components can be input into one end of the optical data link 115, and the light received at the other end of optical data link 115 will also have two components orthogonally polarized relative to each other. However, the optical data link 115 need not transmit information perfectly. For example, the optical data link 115 may have imperfections (e.g., twists in a fiber optic cable) which in turn may cause the two orthogonally polarized components to be aligned differently with respect to an absolute reference frame, such as the earth reference frame. In addition, some dispersion, attenuation or noise effects may be evident at the receiving end due to the data links and elements of the system. However, these distortion effects will not be significant enough to render the information content of the transmitted data undecodable by the receiver. The other links connecting the elements of the system 100 downstream of the polarization filter 103 and the polarization filter 104 (i.e., to the right of 103 and 104 in FIG. 1) should also be adapted to transmit polarized light.

The optical senders 101 and 102 may be optical encoders, optical data generators, sources of optical data received from elsewhere, or any combination thereof. In other words, the optical senders 101 and 102, which may be called optical data source means, can be any source of optical data. The optical sender 101 and the optical sender 102 transmit optical data of the same wavelength, that is, optical data having a certain wavelength plus or minus a tolerance. For example, in an embodiment in which optical polarization multiplexing system 100 is used in an optical LAN, the optical sender 101 could be used to send data at a wavelength $\lambda_1$ from a first computer while optical sender 102 sends data at the same wavelength $\lambda_1$ from a second computer.

The optical sender 101 outputs a data signal to the polarization filter 103, and the optical sender 102 outputs a data signal of the same wavelength to the polarization filter 104. The filter 103 polarizes light received from the optical sender 101. The filter 104 polarizes light received from the optical sender 102 in a polarization orientation orthogonal to that of the filter 103. The polarized light signal of the filter 103 is conveyed to an input of the optical adder 108, and the polarized light signal of the polarization filter 104 is conveyed to another input of the optical adder 108. The optical adder 108 may be a fiber coupler, or any like device capable of adding, or combining, two light signals such as the signals received from the polarization filters 103 and 104. As discussed above, the optical paths between the polarization filters 103 and 104 and the optical adder 108 are capable of transmitting polarized light without losing its orthogonal polarization characteristics.

Since the optical senders 101 and 102 transmit data at the same optical wavelength, the polarized inputs to the optical adder 108 are at the same wavelength, but are orthogonally polarized with respect to each other. The optical adder 108 combines the signals received from the polarization filter 103 and the polarization filter 104 into one signal which is transmitted via optical data link 115 to the optical splitter 128.

The optical splitter 128 divides the received signal into two signals. One of the two signals output from the optical splitter 128 is directed to the polarization filter 123. The other signal output from the optical splitter 128 is directed to the polarization filter 124.

The polarization filter 123 passes only the components of the signal it receives from the optical splitter 128 having a polarization orientation in common with the filter 123. For example, if the filter 123 is configured to be a horizontal polarization filter, then the filter 123 would pass the horizontally polarized component of the received signal from the optical splitter 128. The polarization filter 123 is preferably oriented to pass the signal transmitted by the optical sender 101. On the other hand, the polarization filter 124 eliminates all but the component of its received signal which is orthogonal to that of the filter 123, in order to recover data of the signal transmitted by the optical sender 102. In this way the polarization multiplexed signal transmitted via optical data link 115 is demultiplexed to provide the information of optical senders 101 and 102, respectively.

The signal quality and polarization attributes of the received signals are affected, to a certain extent, by the transmission characteristics of the optical data link 115, as well as the performance characteristics of the various elements of the system 100. Depending upon the signal quality and polarization attributes of the signals received at the polarization filter 123 and polarization filter 124, a need may exist for signal processing and/or signal adjustment in order to recover the signals transmitted by the optical senders 101 and 102. Such signal processing is further described in conjunction with FIG. 3.

Figure 3:
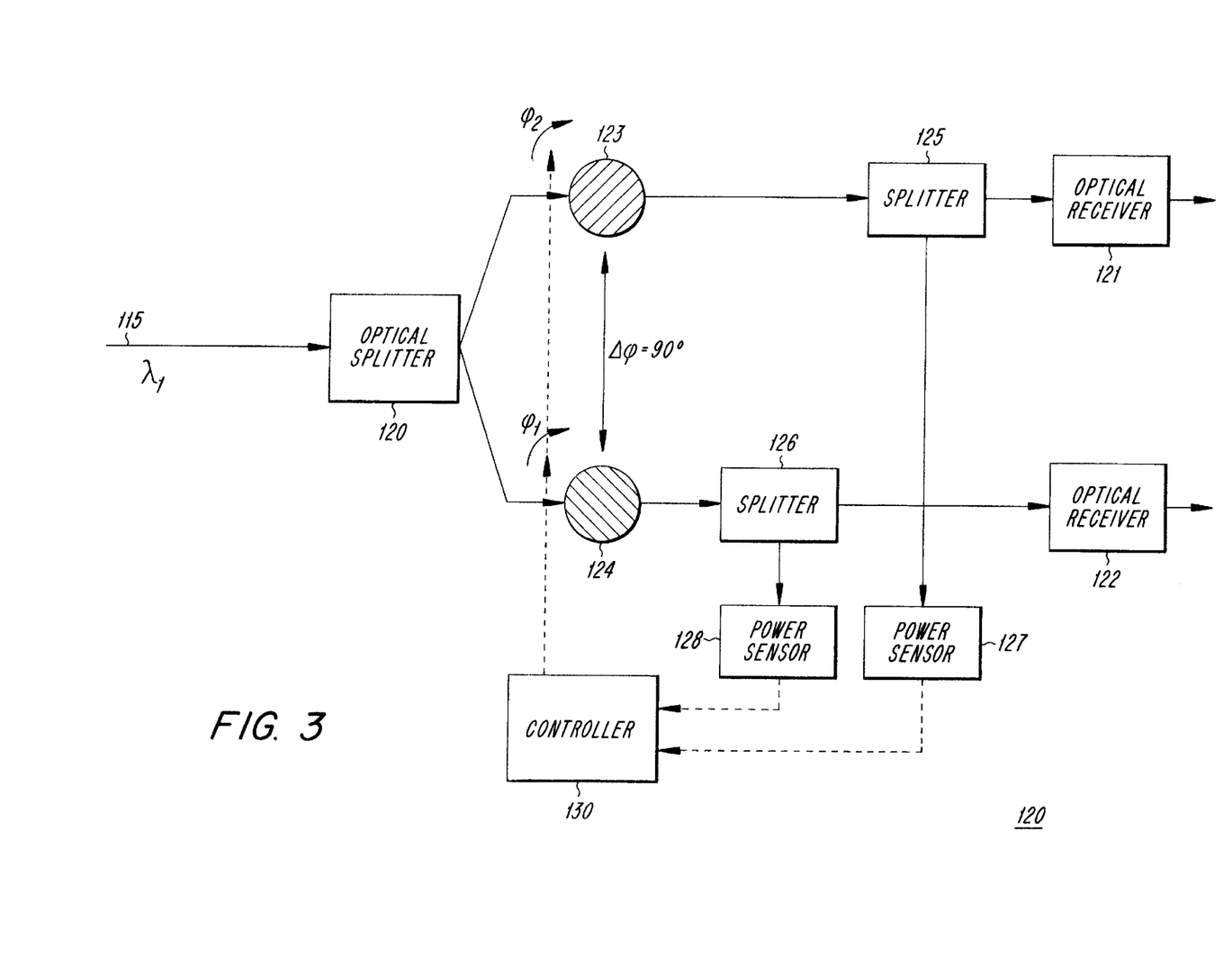
FIG. 3 is an exemplary embodiment the receiving end of an optical polarization multiplexing system, according to the present invention.

FIG. 3 is an exemplary embodiment the receiving end of an optical polarization multiplexing system, according to the present invention. In FIG. 3, like reference numerals in common with FIG. 1 are used to designate like elements. The signal received via optical data link 115 is divided in two by the optical splitter 120, with a portion of the signal being routed to the polarization filter 123 and another portion of the signal being routed to the polarization filter 124.

During transmission via the optical data link 115, and other elements of the system, the signal may have been attenuated, picked up noise, or otherwise suffered quality degradation. The two orthogonal polarization components may not have been subjected to the same degree of degradation. As a result of this sort of degradation, for example, two orthogonal polarization components may not be aligned in the same manner at the receiving end of the optical data link 115 (i.e., input to optical splitter 120) as compared to the transmission end (i.e., output from optical adder 108). For example, in the case of the optical sender 101 being oriented to transmit horizontally polarized light, the received optical data signal from sender 101 at the receiving end of the optical data link 115 may no longer be horizontally polarized due to the transmission characteristics of the system. Thus, it may be difficult to detect or recover the signals since the polarization orientation may not be known. It may be difficult to identify the signals, that is, to distinguish which component of the signal was transmitted by optical sender 101 and which component of the signal was transmitted by the optical sender 102. Hence, a need for signal processing and/or signal adjustment may exist in order to recover and identify the two respective signals.

According to one embodiment, the two components of the signals are recovered and identified by adjusting the receiving end polarization filters to maximize the received power of the signals. In this embodiment, a control unit 130 may be provided in order to adjust the polarization orientation of the polarization filter 123 and the polarization filter 124, as follows. The polarized signals from the polarization filter 123 and the polarization filter 124 are fed into splitters 125 and 126, respectively, as shown in FIG. 3. The splitter 125 provides a portion of the signal from the polarization filter 123 to a power sensor 127, while the splitter 126 provides a portion of the signal from the polarization filter 124 to a power sensor 128. Each of the power sensors 127 and 128 communicates the amount of power of the signal it receives to the control unit 130.

Figure 4:
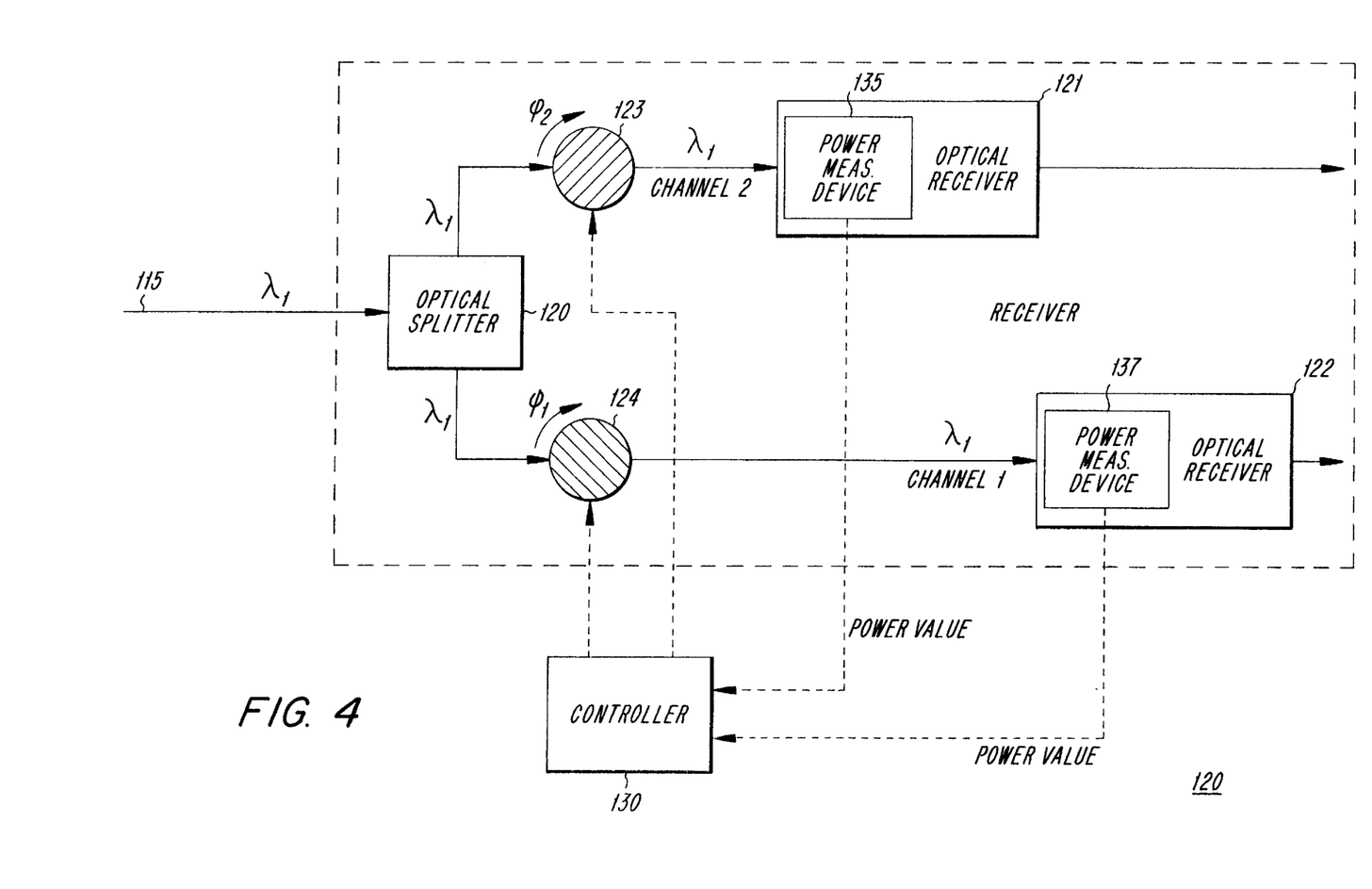
FIG. 4 depicts one exemplary alternative embodiment with receiver end power measurement devices configured within the optical receivers.

FIG. 4 depicts one exemplary alternative embodiment with receiver end power measurement devices configured within the optical receivers. According to alternative embodiments, power values of the received signals may be generated by configuring power measurement devices within various components at the receiver 120. For example, power measurement devices 135 and 137 may be configured within the optical receivers 121 and 122, respectively. The power measurement devices 135 and 137 may be, for instance, avalanche photo diode (APD) devices.

The control unit 130 adjusts or turns the polarization orientation of the polarization filter 123 and the polarization filter 124 in order to maximize the power of the received signal. Since the two signals of optical senders 101 and 102 are known to be orthogonal to each other, the control unit 130 maintains the orthogonal relationship between the received signals, adjusting the filters 123 and 124 by the same amount. For example, it may be the case that the power level of the received signals is a certain level when the polarization filter 123 and the polarization filter 124 are precisely oriented horizontally and vertically, respectively.

By adjusting the polarization orientation of filters 123 and 124, it may be found that the power level varies from a maximum value (i.e., when the two received signals are correctly aligned with respect to the polarization filters 123 and 124) to a minimum value (i.e., when the two received signals are misaligned with respect to the polarization filters 123 and 124). Thus, by adjusting the polarization alignment to maximize the measured optical power, the two channels originating from the optical senders 101 and 102 may be separated again.

It may happen that the polarization filters 123 and 124 in the receiver 120 are initially adjusted incorrectly to pass a signal from the wrong source. For instance, the orientation of the polarization filter 123 could be misadjusted to pass the signal originating from the optical sender 102 rather than optical sender 101. In this case, signal processing may be used to readjust the polarization filters 123 and 124 in the receiver 120. Such signal processing to identify the respective signals is described below.

In an alternative embodiment, the orthogonal relationship between the two components need not be strictly maintained. If it is found that the transmission line characteristics are such that one of the components (i.e., a signal of optical sender 101 or 102) is misaligned more severely than the other, the control unit 130 may be programmed to alter the orthogonal relationship between the polarization filter 123 and the polarization filter 124.

In another alternative embodiment, it may be found that one component is attenuated by a greater amount than the other in transmission of the combined signals. For example, the component corresponding to the optical sender 101 could be attenuated by a 3 dB amount, while the orthogonal component corresponding to the optical sender 102 could be attenuated by 9 dB. In such a case, one or more amplifiers may be used within the optical polarization multiplexing system 100 to increase the more severely attenuated component. The amplifier(s) may be located either within the receiver 120, the sender 110, or optical data link 115. The amplifier(s) may operated at a fixed amplification, or may be adjustable and controlled, for instance, by the control unit 130. Depending on the location of the amplifier(s), (e.g., within the receiver 120, the sender 110, or optical data link 115) it may be necessary to employ amplifier(s) which maintain the polarization characteristics of the signal. For example, an amplifier located within the signal path of the optical data link 115 should maintain the relative polarization between the components of an optical signal being transmitted through it (i.e., the signal components should remain orthogonal).

Another embodiment of the present invention involves encoding the signal components of optical senders 101 and 102 in a manner so as to convey identity information along with the transmitted signal. For example, each of the optical senders 101 and 102 may be configured with an encoder which labels the signals. An overhead, header or preamble portion of the signal could be used as a label, or a periodic pattern of bits could be inserted to identify the signal. Alternatively, the encoding could be achieved by varying the power of the signal. For instance, the two signal components from the optical senders 101 and 102 could be transmitted with fixed optical power level offset, or with differing schemes of power modulation, in order to identify the respective components.

Figure 5:
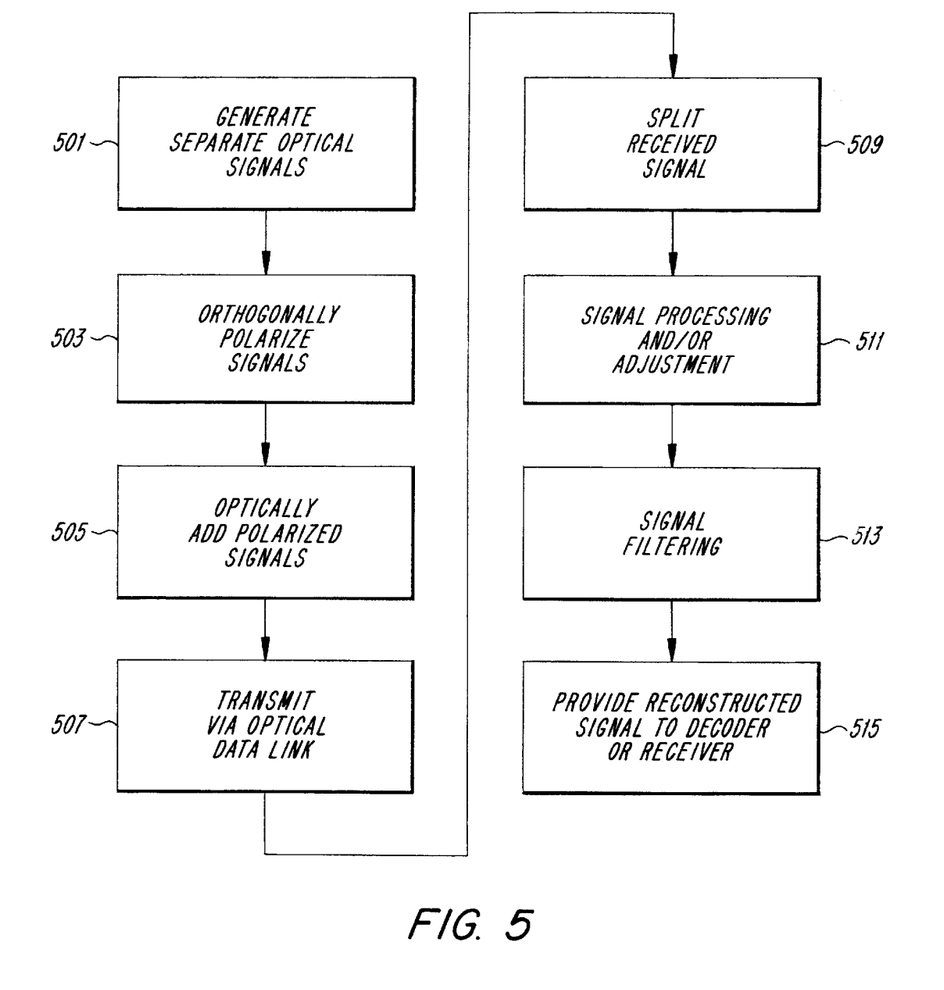
FIG. 5 is an exemplary method of optical polarization multiplexing, according to the present invention.

FIG. 5 is a method of optical polarization multiplexing, according to an exemplary embodiment of the present invention. In the first step of the method, step 501, separate optical signals of the same wavelength to be transmitted are generated. The step 501 includes receiving optical signals from another source, and may entail signal processing or applying a frequency offset or frequency scaling one or both of the signals. Upon completion of step 501, a step 503 is performed in which the two optical signals are each subjected to a polarization filter orthogonal with respect to the filter of the other signal (e.g., vertical polarization and horizontal polarization). Following the step 503, the two orthogonally polarized signals are optically added to provide a single optical transmission signal having two polarized components. The method then proceeds to step 507.

In the step 507, the optical transmission signal is sent via a transmission link to a receiving end having an optical splitter. Then in step 509, the received transmission signal is split into two parts. It may be necessary perform signal processing or orientation adjustment on the two split signals, in order to recover and/or identify the signals originally generated in the step 501. Such signal processing or orientation adjustment is indicated in step 511. In practice, preparation of the transmission signal components for the signal processing or adjustment may take place prior the signal being transmitted via the optical data link.

The signal processing or orientation adjustment of step 511 may consist of labeling the two components, or variously modulating them or applying a power level offset. In step 513, the two split parts of the received transmission signal are respectively routed to two polarization filters having the same relative polarization orientation, with respect to each other, as the two polarization filters of the step 503. That is, if the two filters of step 503 are orthogonal with respect to each other, then typically the two filters of step 513 must be orthogonal with respect to each other also. Following polarization of the two split parts, and any signal processing or adjustment necessary to identify the signals as corresponding to the generated signals of the step 501, the signals are then provided to a decoder, a receiver, or other end use.

It may be the case that the relative polarization orientation of the two signal components is altered slightly during transmission, due, for instance, to the characteristics of the optical data link 115 or other component of system 100, or because of other like considerations. In such a case, the orientation of the polarization filters 124 and 124 in the receiving end may be varied from an orthogonal relationship. For example, the angle between the polarization filters 124 and 124 may be adjusted to be 87° rather than 90°.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An optical polarization multiplexing apparatus, comprising:
   a first polarization filter through which a first optical signal passes;
   a second polarization filter through which a second optical signal passes;
   an optical adder in communication with the first polarization filter and the second polarization filter to receive the first optical signal and the second optical signal, the optical adder adding and outputting an optical transmission signal having a first polarization orientation component and a second polarization orientation component;
   an optical splitter in communication with an output of the optical adder to receive the optical transmission signal;
   a third polarization filter in communication with the optical splitter, the third polarization filter recovering the first optical signal;
   a fourth polarization filter in communication with the optical splitter, the fourth polarization filter recovering the second optical signal;
   an optical data link between the optical adder and the optical splitter; and
   a control unit connected to control an orientation of the third and the fourth polarization filters to recover the first and the second optical signals, respectively.

2. The optical polarization multiplexing apparatus of claim 1, wherein the first polarization orientation component has power level modulation differing from the second polarization orientation component.

3. The optical polarization multiplexing apparatus of claim 1, wherein the first optical signal is labeled with a label and a signal processor perceives the label to control an orientation of the third and the fourth polarization filters to recover the first and the second optical signals, respectively.

4. An optical polarization multiplexing apparatus, comprising:
   a first polarization filter through which a first optical signal passes;
   a second polarization filter through which a second optical signal passes;
   an optical adder in communication with the first polarization filter and the second polarization filter to receive the first optical signal and the second optical signal, the optical adder adding and outputting an optical transmission signal having a first polarization orientation component and a second polarization orientation component;
   an optical splitter in communication with an output of the optical adder to receive the optical transmission signal;
   a third polarization filter in communication with the optical splitter, the third polarization filter recovering the first optical signal;
   a fourth polarization filter in communication with the optical splitter, the fourth polarization filter recovering the second optical signal;
   an optical data link between the optical adder and the optical splitter; and
   a first and a second power sensor in communication with said optical splitter, the first and a second power sensors sensing power levels of signals corresponding to signals received by the third and the fourth polarization filters, respectively.

* * * * *